United States Patent Office 3,465,239
Patented Sept. 2, 1969

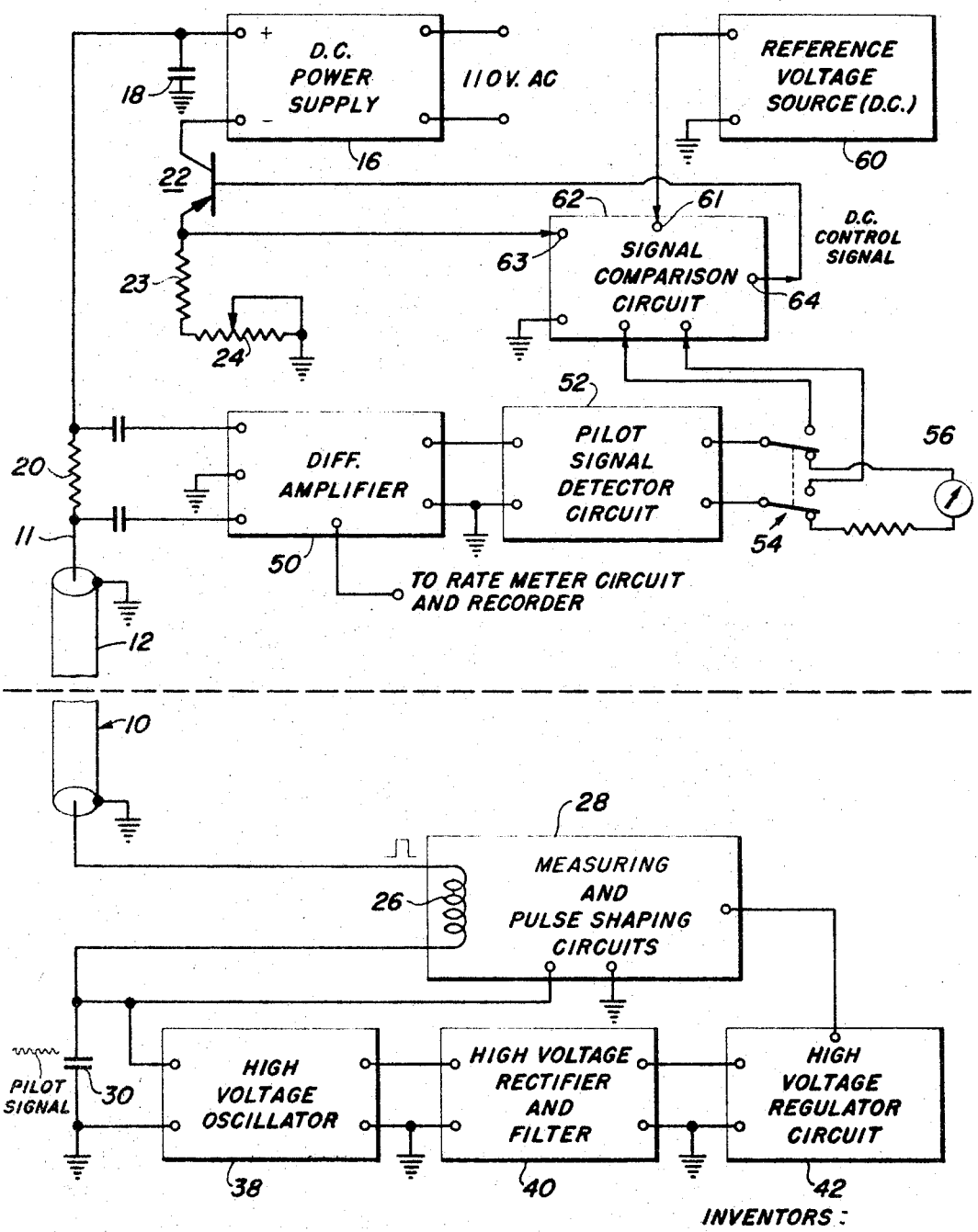

3,465,239
STABILIZED POWER SUPPLY ARRANGEMENT FOR WELL LOGGING SYSTEM
Homer M. Wilson and Leroy C. Delatorre, Houston, Tex., assignors, by mesne assignments, to Dresser Industries, Inc., a corporation of Delaware
Filed Apr. 20, 1965, Ser. No. 449,495
Int. Cl. G01v *3/00, 3/18, 1/40*
U.S. Cl. 324—1                 12 Claims

ABSTRACT OF THE DISCLOSURE

A D.C. power supply at the earth's surface is connected in series with a resistive measuring element, a variable impedance transistor control device and a signal sampling resistor to the upper end of the logging cable. In the subsurface unit, the D.C. voltage produced across a capacitative load circuit is employed to energize an oscillator and the output of this oscillator is rectified and filtered to provide energizing voltage for the measuring device in the subsurface unit. The oscillator is arranged so that its frequency of oscillation varies in proportion to the voltage produced across the capacitative load circuit and during periods when the oscillator draws current from this load circuit the voltage thereacross is reduced to produce a ripple component across the capacitative load circuit which constitutes an alternating current pilot signal and is transmitted to the earth's surface over the same conductor as the logging signal. This pilot signal is detected at the earth's surface and is employed selectively to provide either an indication of the actual voltage developed in the subsurface unit, or in the alternative, is applied to a signal comparison circuit wherein it is compared with a stabilized reference voltage to control the variable impedance transistor and maintains the voltage actually developed in the subsurface unit constant despite variations in operating temperature, length of cable employed, variations in leakage resistance of the cable and current drain in the subsurface unit.

---

The present invention relates to well logging systems, and more particularly, to such systems wherein provision is made for energizing the system from the earth's surface while providing a high degree of stabilization for the subsurface unit during the logging operation.

While certain arrangements have been made heretofore utilized for energizing the subsurface unit of a well logging system from the earth's surface, these arrangements have in general not been satisfactory in providing the required degree of stabilization of the electronic circuitry in the subsurface unit. In general, these arrangements have required a separate power supply, filter circuit and voltage regulation circuit in the subsurface unit to operate the electronic circuitry thereof under the adverse conditions, such as temperatures in the order of 200° centigrade, which are experienced in deep bore holes. When transistors are employed in the subsurface unit, it could be desirable to energize these transistors and their associated circuitry directly from the earth's surface. However, when different lengths of cable are connected to the subsurface unit the voltage supplied to the subsurface unit would vary due to the voltage drop in the cable itself. Also, the cable may have leakage resistance between conductors or between conductor and sheath. Thus, if the cable has been patched many times or the insulation has been soaked in salt water, leakage resistance will dissipate part of the energy supplied from the earth's surface and the amount so dissipated will vary from one cable to another depending on the condition thereof. Furthermore, when the cable is operated at high temperatures, as during the logging operation, this leakage resistance will change which will in turn change the voltage supplied to the circuitry in the subsurface unit when the power supply is located at the earth's surface.

It is, therefore, an object of the invention to provide a new and improved power supply arrangement for a well logging system wherein one or more of the above-discussed disadvantages of the prior art is eliminated.

It is another object of the present invention to provide a new and improved power supply arrangement for a well logging system wherein a constant current source at the earth's surface is employed directly to energize circuitry in the subsurface unit.

It is a further object of the present invention to provide a new and improved well logging system wherein facilities are provided for maintaining a constant check at the earth's surface of the actual voltage conditions in the subsurface unit during the logging operation.

It is a still further object of the present invention to provide a new and improved well logging system wherein power for the subsurface unit is supplied from the earth's surface and means are provided for automatically maintaining the voltage actually supplied to the subsurface unit substantially constant.

It is another object of the present invention to provide a new and improved well logging system wherein power is supplied to the subsurface unit over the same conductor employed to transmit the logging signal to the earth's surface and a pilot signal is also transmitted to the earth's surface and is utilized to maintain the voltage in the subsurface unit substantially constant.

It is still another object of the present invention to provide a new and improved well logging system wherein a constant current source is employed at the earth's surface to energize circuitry in the subsurface unit and facilities are provided for adjusting the value of constant current supplied to the subsurface unit and indicating the adjusted value of current at the earth's surface.

Briefly, in accordance with one aspect of the invention, a constant current source is provided at the earth's surface and is connected to the cable at the upper end thereof. In the subsurface unit, there is provided means for developing an alternating current pilot signal the frequency of which varies in accordance with the voltage supplied to the subsurface unit over the cable. This pilot signal is transmitted over the same conductor which is utilized to transmit the logging signal to the earth's surface, and is employed at the earth's surface to develop an output signal accurately representing the electrical voltage actually supplied to the subsurface unit by the constant current supply. This output signal may therefore be used as an indication of the actual voltage conditions in the subsurface unit, or, in the alternative, may be compared with a stabilized reference signal to derive an error signal which is employed automatically to adjust the constant current source so as to maintain the voltage conditions in the subsurface unit substantially constant despite wide variations in operating temperature while logging, length of cable employed and leakage resistance of the cable during the logging operation.

The invention, both as to its organization and method of operation, together with further objects and advantages thereof, will best be understood by reference to the following specification taken in connection with the accompanying drawing in which the single figure of the drawing is a schematic diagram of a well logging system embodying the principles of the present invention.

Referring now to the drawing, the present invention is therein illustrated as comprising a cable 10 having a center conductor 11 and a grounded sheath 12, which is employed to transmit signals between the surface equipment shown above the horizontal dotted line in the figure and the subsurface equipment contained in a suitable housing and adapted to be raised and lowered within the bore hole by connection to the bottom end of the cable 10. The surface equipment comprises a D.C. power supply 16 across the output terminals of which there is provided a filter capacitor 18. The positive terminal of the power supply 16 is connected through a small series resistor 20 to the center conductor 11 of the cable 10. The negative terminal of the supply 16 is connected to the collector of a current regulating transistor 22 the emitter of which is connected through a resistor 23 and a variable potentiometer 24 to ground. In the subsurface unit the center conductor 11 of the cable 10 is connected through an output winding 26 of the measuring and pulse shaping circuits 28 to the upper end of a filter capacitor 30 the bottom end of which is connected to ground, i.e., the sheath of the cable 10.

It will thus be seen that current provided by the power supply 16 flows through the resistor 20, over the center conductor 11 of the cable 10, through the coil 26 to the filter capacitor 30, back through the sheath 12 of the cable 10, through the potentiometer 24 and resistor 23 and the emitter-collector circuit in the transistor 22 to the negative terminal of the supply 16. The voltage developed across the capacitor 30 in the subsurface unit is employed directly to energize the pulse shaping circuit in the circuitry 28. Preferably, the circuitry 28 employs transistors, in which case the voltage developed across the capacitor 30 may be of relatively small value in the order of 30 volts.

In the subsurface unit, the measuring unit in the circuitry 28 is arranged to produce a suitable electrical signal corresponding to the measured parameter or characteristic of the surrounding formations. This signal is preferably a pulse type signal, although the measuring unit may form a part of either an acoustic or a radiation type well logging system insofar as the present invention is concerned. The relatively low voltage produced across the capacitor 30 is arranged to energize a high voltage oscillator 38 which oscillator develops a relatively high amplitude oscillatory signal having a frequency in the order of 1,000 cycles per second. The output of the high voltage oscillator 38 is supplied to a high-voltage rectifier and filter circuit 40 wherein the alternating current signal developed by the oscillator 38 is rectified and is applied through a suitable high voltage regulator circuit 42 to the circuitry 28 so as to maintain the high voltage supplied to the measuring unit thereof substantially constant.

In accordance with an important feature of the invention, the high voltage oscillator 38, which is energized from the relatively low voltage developed across the capacitor 30, is of the type wherein the frequency of the oscillator output signal varies in accordance with the energizing voltage appearing across the capacitor 30. Thus, as the voltage developed across the capacitor 30 varies, a corresponding change is produced in the frequency of the high amplitude signal developed by the high voltage oscillator 38. This change in frequency, which may be relatively slight, does not effect the operation of the circuits 40 and 42 since the oscialtor output signal is rectified in the circuit 40 and is applied to the voltage regulator 42 without substantial variation due to a slight change in the frequency of the oscillator signal. However, this change in frequency of the oscillator signal is employed to produce a corresponding pilot signal which is in effect a ripple component of voltage appearing across the capacitor 30. To accomplish this, the value of the filter capacitor 30 is purposely chosen so that it does not provide complete filtering action with respect to the current drawn by the oscillator 38. Accordingly, during periods when the high voltage oscillator 38 is drawing current from the capacitor 30, the voltage across this capacitor will dip slightly. Since the oscillator 38 will draw current from the capacitor 30 on the peaks of both half cycles of the oscillatory wave, the pilot signal or ripple component developed across the capacitor 30 will have a frequency twice that of the oscillator 38. Thus, the pilot signal developed across the capacitor 30 may have a frequency in the order of 2,000 cycles per second.

Preferably, the high voltage oscillator 38 comprises a pair of transistors which are interconnected through a control transformer having a square hysteresis loop core in an appropriate manner to develop a low voltage oscillatory signal of the required frequency. An output or step-up transformer is then employed to raise the voltage level of this oscillatory signal to the desired value such that when rectified, filtered, and regulated, the resultant high voltage is suitable for energizing the measuring unit in the circuitry 28. By employing such a magnetic coupled oscillator, the saturable core of the control transformer is effective in that the transformer current will be the integral of the applied voltage and therefore the time required to reach saturation current will be inversely proportional to the applied voltage, as will be readily understood by those skilled in the art. Accordingly, the applied voltage will determine the oscillator frequency. As the supply voltage across the capacitor 30 increases, for example, a greater charging current flows through the control transformer with the result that the saturation point is reached more quickly, and hence the frequency of the oscillator is increased. Accordingly, the frequency of the pilot signal ripple component developed across the capacitor 30 varies in frequency in accordance with the unidirectional voltage developed across the capacitor 30.

While a suitably regulated high voltage is usually required when the measuring unit is a radiation detector, it will be appreciated that other types of well logging systems may not require regulated high voltage for the measuring unit in which case the low voltage output of the oscillator 38 may be filtered and used directly for the measuring unit.

In the surface equipment, both the logging pulses appearing across the coil 26 and the pilot signal developed across the capacitor 30 appear across the resistor 20 and are coupled to a differential amplifier circuit indicated generally at 50. One output of the differential amplifier 50 may be employed as the logging signal output and in the case of a radiation logging system, is supplied to a suitable rate meter circuit wherein the logging pulses are employed to derive a unidirectional signal having an amplitude proportional to the rate of occurrence of these pulses, this output signal being applied to a suitable recorder, as will be readily understood by those skilled in the art. The pilot signal or ripple component, which it will be recalled has a frequency in the order of 2,000 cycles per second, is supplied from the other output of the differential amplifier 50 to a pilot signal detector circuit 52. The detector circuit 52 may comprise any suitable frequency discriminator arrangement whereby a demodulated output control signal is produced which is correlated in amplitude with the deviation of the frequency of the pilot signal from a predetermined center frequency. For example, the discriminator in the detector circuit 52 may be set to a center frequency of 2,000 cycles per second, in which case the detector circuit 52 will have no output signal, or a balanced output signal in the event of a push-pull output circuit, when the pilot signal transmitted to the earth's surface has a frequency of 2,000 cycles per second. However, when the frequency of the pilot signal increases to say 2,005 cycles per second, the detector circuit 52 produces a positive unidirectional control signal of predetermined magnitude and conversely, when the frequency of the pilot signal decreases to say 1,995 cycles per second, the polarity of the output signal developed at the detector circuit 52 will be reversed and of a corresponding magnitude.

Since the pilot signal is continuously developed in the subsurface unit, the output of the detector circuit 52 may be employed to provide an indication at the earth's surface of the actual voltage conditions existing in the subsurface unit. To this end, a selector switch 54 may be employed to connect the output of the detector circuit 52 to a suitable indicating meter 56 so that the operator of the logging system is readily informed of the actual voltage conditions in the subsurface unit. Preferably, the indicating meter 56 is calibrated in terms of the actual conditions existing in the subsurface unit, and the meter 56 is a zero center reading meter. Thus, if the normal voltage developed across the capacitor 30 is 30 volts, the meter 56 will be calibrated to a center reading of 30 volts and proportionately higher and lower readings about this center will correspond to changes in frequency and polarity of the pilot signal in response to a predetermined change in voltage within the subsurface unit.

Considering now the arrangement whereby the current supplied to the subsurface unit is maintained substantially constant and may also be automatically controlled in accordance with the actual voltage conditions existing in the subsurface unit, there is provided at the earth's surface a reference voltage source 60 which is arranged to provide a highly stabilized reference signal at the output thereof. For example, the reference voltage source 60 may comprise a suitable Zener diode voltage or current regulator or other highly stabilized source of reference signal. The reference signal from the source 60 is supplied to a signal comparison circuit 62, and in addition, the voltage developed across the resistor 23 and potentiometer 24, due to the above-described current flow through these elements, is also supplied to the input terminal 63 of the signal comparison circuit 62. The voltage appearing across the resistor 23 and potentiometer 24 is compared with the reference signal in the signal comparison circuit 62 which functions to derive an error signal proportional to any difference therebetween, this error signal comprising a D.C. control signal which appears at the output terminal 64 of the signal comparison circuit 62 and is supplied to the base of the transistor 22. This error signal is of the proper polarity to control conduction through the transistor 22 in such a direction that the current supplied to the subsurface unit is held constant. Thus, if the current flow to the subsurface unit increases, the voltage appearing across the resistor 23 and the potentiometer 24 also increases, since these elements are in the above-described series circuit connected to the output terminals of the power supply 16. This increase in voltage is applied to the signal comparison circuit and results in an error signal being applied to the base of the transistor 22 of such polarity as to cause the transistor 22 to conduct less heavily with the result that the current flowing to the subsurface unit is returned to its original value. The current supplied to the subsurface unit is thereby maintained substantially constant irrespective of any voltage drop produced in the conductors of the cable 10, since the variable which is being regulated is the current flowing in this conductor rather than any voltage drop produced per unit of length along the cable.

In accordance with a further feature of the invention, the value of constant current can be adjusted by variation of the potentiometer 24. For example, if the potentiometer 24 is adjusted to provide less resistance in the circuit, the current flow through the cable and hence the voltage produced across the capacitor 30 in the subsurface unit will increase to a value such that the voltage applied to the terminal 63 of the signal comparison circuit 62 is almost equal to the reference signal applied to the terminal 61. Furthermore, since the frequency of the pilot signal varies in accordance with the voltage developed across the capacitor 30, a continuous indication of the actual voltage conditions in the subsurface unit is provided when the switch 54 is thrown to the position wherein the meter 56 indicates the output of the detector circuit 52. Accordingly, the operator of the logging system can adjust the operating voltage within the subsurface unit to any desired value and can monitor this voltage as the logging operation progresses.

While the above-described constant current arrangement is effective to stabilize the operation of the subsurface unit insofar as changes in cable length are concerned, the situation may also occur wherein the leakage resistance of the cable varies, as described generally heretofore. Such leakage resistance will effectively shunt a portion of the current supplied to the subsurface unit since this leakage resistance may occur between the center conductor and sheath at any point along the length of the cable 10. Accordingly, changes in leakage resistance, due to temperature variations, soaking in salt water, or other causes, will change the division of current between the electronic circuitry within the subsurface unit and the current flowing through the leakage resistance of the cable and hence cause a corresponding change in the operating voltage within the subsurface unit. Also, the current drawn by the electronic circuitry within the subsurface unit itself may vary, with changes in ambient temperature or the like, which will have the effect of changing the operating voltage across the capacitor 30 since the above-described surface equipment functions to hold the current supplied to the cable 10 constant. This effect will be readily apparent when it is realized that a change in the impedance of this electronic circuitry will produce a change in voltage across the capacitor 30, since if the current is held constant and the impedance load through which the current flows varies, the voltage across this load impedance will vary correspondingly.

In accordance with a further important feature of the invention, the detected pilot signal, i.e., the output of the detector circuit 52 may be employed as an automatic control signal whereby the voltage developed across the capacitor 30 is maintained substantially constant despite changes in leakage resistance of the cable, changes in current drawn by the subsurface unit circuitry, or other normally disturbing factors. More particularly, when the switch 54 is thrown to its upper position the output of the detector circuit 52 is supplied to another input circuit 65 of the signal comparison circuit 26 and is therein compared with the reference voltage applied to the terminal 61 and the signal representing current flow in the cable applied to the terminal 63. If the voltage developed across the capacitor 30 in the subsurface unit changes, due to a change in the leakage resistance of the cable 10, or for any other reason, the frequency of the pilot signal will vary correspondingly and the output of the detector circuit 52, which is a unidirectional voltage or current, will also vary in a similar manner. This means that the error signal developed at the output terminal 64 of the signal comparison circuit 62 and applied to the base of the transistor 22 will adjust the conduction of this transistor to correct for the change in voltage condition within the subsurface unit. Accordingly, the voltage actually supplied to the oscillator 38 and the preamplifier and pulse shaping circuits 28 within the subsurface unit is accurately stabilized by means located at the earth's surface even though the cable length may vary or the leakage resistance of a given cable may vary during the logging operation.

While the present invention has been illustrated in conjunction with a single conductor cable system, it will be appreciated that this invention may equally well be employed in multi-conductor systems. In such systems, any two conductors of the cable may be employed instead of the conductor and sheath of the cable 10. However, if both cable conductors are ungrounded, a suitable floating ground connection between the units in the surface equipment should be employed, as will be readily apparent to those skilled in the art.

While there has been illustrated and described a single embodiment of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. In a well logging system, the combination of, a subsurface unit, a cable for raising and lowering said unit within a bore hole, a measuring device within said unit and adapted to measure a given parameter and to produce an electrical signal proportional to said parameter, a source of unidirectional current at the earth's surface, a variable impedance device, means connecting said impedance device and said source in series to one conductor at the upper end of said cable, means in said unit for utilizing current transmitted from said source over said one conductor to energize said measuring device, means for transmitting said electrical signal over said one conductor to the earth's surface, means at the earth's surface for measuring the current supplied by said source to said cable, and means for controlling said variable impedance device in accordance with said measured current to maintain said measured current substantially constant.

2. In a well logging system, the combination of, a subsurface unit, a cable for raising and lowering said unit within a bore hole, a measuring device within said unit and adapted to measure a given parameter within the bore hole and to produce an electrical signal proportional to said parameter, a source of unidirectional current at the earth's surface, a variable impedance device, means connecting said impedance device and said source in series to one conductor at the upper end of said cable, means in said unit for utilizing current transmitted from said source over said one conductor to energize said measuring device, means for transmitting said electrical signal over said one conductor to the earth's surface, means at the earth's surface for measuring the current supplied by said source to said cable, a stabilized reference source, means for comparing said measured current with a signal from said stabilized reference source, and means utilizing the output of said comparing means to control said variable impedance device to maintain said measured current substantially constant.

3. In a well logging system, the combination of, a subsurface unit, a cable for raising and lowering of said unit within a bore hole, a load circuit in said subsurface unit and connected to one conductor of said cable, a source of unidirectional current, a variable impedance device, a measuring impedance, means connecting said source, said device and said measuring impedance in series circuit relation to said one conductor of said cable at the earth's surface, a stabilized reference source, means for comparing a signal from said reference source with the current flowing through said measuring impedance and developing an error signal proportional to the difference therebetween, means for controlling the impedance of said variable impedance device in accordance with said error signal, thereby to maintain the current supplied to said load circuit in said subsurface unit substantially constant, and means for adjusting the value of said measuring impedance, thereby to adjust the value of said constant current supplied to said subsurface unit.

4. The combination as claimed in claim 3, wherein said variable impedance device is a transistor having an emitter, a collector and a base, means connecting said emitter and collector in series with said unidirectional source and said measuring impedance, and means connecting said error signal to said base.

5. In a well logging system, the combination of, a subsurface unit, a cable for raising and lowering said unit within a bore hole, a load circuit in said subsurface unit and connected to said cable, a source of unidirectional current, means connecting said unidirectional source to said cable at the earth's surface, means in said subsurface unit for developing a pilot signal having a frequency proportional to the voltage developed across said load circuit by flow of current from said source therethrough, means for transmitting said pilot signal over said cable to the earth's surface, means at the earth's surface for developing a stabilized reference signal, means for converting said pilot signal into a control signal having a magnitude proportional to the frequency of said pilot signal, means for comparing said control signal with said reference signal and producing an error signal proportional to the difference therebetween, and means employing said error signal to maintain the current supplied to said load circuit by said unidirectional source substantially constant.

6. In a well logging system, the combination of, a subsurface unit, a cable for raising and lowering said unit within a bore hole, a load circuit in said subsurface unit and connected to said cable, a source of unidirectional current, means connecting said unidirectional source to said cable at the earth's surface, means in said subsurface unit for developing a pilot signal having a frequency proportional to the voltage developed across said load circuit by flow of current from said source therethrough, means for transmitting said pilot signal over said cable to the earth's surface, means at the earth's surface for developing a stabilized reference signal, means for converting said pilot signal into a control signal having a magnitude proportional to the frequency of said pilot signal, means for comparing said control signal with said reference signal and producing an error signal proportional to the difference therebetween, a variable impedance device connected in series with said unidirectional source to said cable, and means for controlling the impedance of said device in accordance with said error signal to maintain the current supplied to said load circuit by said unidirectional source substantially constant.

7. In a well logging system, the combination of, a subsurface unit, a cable for raising and lowering said unit within a bore hole, a load circuit in said subsurface unit and connected to said cable, a source of unidirectional current, means connecting said unidirectional source to said cable at the earth's surface, means in said subsurface unit for developing a pilot signal having a frequency proportional to the voltage developed across said load circuit by flow of current from said source therethrough, means for transmitting said pilot signal over said cable to the earth's surface, means at the earth's surface for developing a stabilized reference signal, a variable impedance device, a measuring impedance, means connecting said variable impedance device and said measuring impedance in series with said unidirectional source to said cable, means for converting said pilot signal into a control signal having a magnitude proportional to the frequency of said pilot signal, means for comparing said control signal with said reference signal and the current flowing through said measuring impedance to derive an error signal proportional to the difference therebetween, and means connecting said error signal to said variable impedance device to control the same so that the current supplied to said load circuit by said unidirectional source is automatically maintained substantially constant.

8. In a well logging system, the combination of, a subsurface unit, a cable for raising and lowering said unit within a bore hole, a load circuit in said subsurface unit and connected to said cable, a source of unidirectional current, means connecting said unidirectional source to said cable at the earth's surface, means in said subsurface unit for developing a pilot signal having a frequency proportional to the voltage developed across said load circuit by flow of current from said source therethrough, means for transmitting said pilot signal over said cable to the earth's surface, means at the earth's surface for developing a stabilized reference signal discriminator means at the earth's surface for developing a control signal having an amplitude proportional to the frequency deviation of said pilot signal from a predetermined center frequency means for comparing said control signal with said reference signal and producing an error signal proportional to the difference therebetween, and means employing said error signal to maintain the current supplied to said load circuit by said unidirectional source substantially constant.

9. In a well logging system, the combination of, a subsurface unit, a cable for raising and lowering said unit within a bore hole, a parameter measuring device within said unit and adapted to produce an electrical signal, a source of unidirectional voltage at the earth's surface, a capacitive load circuit in said subsurface unit, means for supplying direct current from said source over said cable to said load circuit to develop a unidirectional voltage thereacross, an oscillator in said subsurface unit and arranged to draw current from said load circuit periodically so that an alternating current pilot signal is developed across said load circuit, the frequency of said pilot signal varying in accordance with the value of said unidirectional voltage, means for rectifying the output of said oscillator, means utilizing said rectified output to energize said measuring device, means for transmitting said electrical signal and said pilot signal over said cable to the earth's surface, means at the earth's surface for utilizing said electrical signal to produce a corresponding log, and means at the earth's surface and responsive to the frequency of said pilot signal for developing an output signal accurately representing said unidirectional voltage.

10. The combination as set forth in claim 9, wherein both said alternating current pilot signal and said electrical signal are transmitted over the same conductor of said cable to the earth's surface.

11. The combination as set forth in claim 9, wherein there is provided means at the earth's surface for indicating the value of said output signal.

12. The combination as set forth in claim 11, wherein there is provided means for varying the amount of direct current supplied by said source to said cable, whereby said unidirectional voltage may be adjusted to any desired value as shown by said indicating means.

References Cited

UNITED STATES PATENTS

| | | | |
|---|---|---|---|
| 2,712,629 | 7/1955 | Doll | 324—1 |
| 2,829,334 | 4/1958 | Murnighan | 323—4 XR |
| 2,888,632 | 5/1959 | Livezey | 323—4 |
| 2,912,637 | 11/1959 | Barnes et al. | 331—186 X |
| 3,103,626 | 9/1963 | Burton et al. | 324—1 |
| 3,105,190 | 9/1963 | Norris | 324—6 |
| 3,205,433 | 9/1965 | Lamb | 324—10 |

GERARD R. STRECKER, Primary Examiner

U.S. Cl. X.R.

323—4; 340—18